United States Patent
Jones

(10) Patent No.: US 12,202,640 B2
(45) Date of Patent: Jan. 21, 2025

(54) BALE TAGGING DEVICE

(71) Applicant: DEERE & COMPANY, Moline, IL (US)

(72) Inventor: Austin J. Jones, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 781 days.

(21) Appl. No.: 17/444,300

(22) Filed: Aug. 3, 2021

(65) Prior Publication Data

US 2023/0041824 A1    Feb. 9, 2023

(51) Int. Cl.
| | | |
|---|---|---|
| B65C 7/00 | (2006.01) | |
| B65C 3/02 | (2006.01) | |
| G09F 3/12 | (2006.01) | |
| A01F 15/08 | (2006.01) | |
| B65C 9/32 | (2006.01) | |

(52) U.S. Cl.
CPC ............ *B65C 7/00* (2013.01); *B65C 3/02* (2013.01); *G09F 3/12* (2013.01); *A01F 15/0883* (2013.01); *B65C 9/32* (2013.01)

(58) Field of Classification Search
CPC .... G09F 3/12; B65C 9/32; B65C 7/00; B65C 3/02; A01F 15/0883; A01F 15/08; A01F 15/071; A01F 15/07
See application file for complete search history.

(56) References Cited

U.S. PATENT DOCUMENTS

| | | | |
|---|---|---|---|
| 3,890,891 A | 6/1975 | Floyd et al. | |
| 4,286,513 A * | 9/1981 | Floyd ................ | A01F 15/08 |
| | | | 40/305 |
| 4,479,427 A | 10/1984 | Floyd et al. | |
| 5,615,544 A * | 4/1997 | Berger ............... | A01F 15/0833 |
| | | | 100/88 |
| 6,370,852 B1 | 4/2002 | Ohlemeyer et al. | |

(Continued)

FOREIGN PATENT DOCUMENTS

| | | | | |
|---|---|---|---|---|
| DE | 10204941 A1 * | 8/2003 | ............ | A01F 15/08 |
| EP | 1053673 B1 | 8/2004 | | |

(Continued)

OTHER PUBLICATIONS

Extended European Search Report and Written Opinion issued in European Patent Application No. 22184644.7, dated Dec. 21, 2022, in 07 pages.

*Primary Examiner* — Arpad Fabian-Kovacs

(57) ABSTRACT

A tag installer for a baler implement includes a housing having a wall defining a baling chamber. The tag installer includes a retractable member having a tooth portion rotatably moveable about a member rotation axis between an installation position and a tag loading position. When in the installation position, the tooth portion is positioned to extend through an opening in the wall and penetrate a bale within the baling chamber. When in the tag loading position, the tooth portion is withdrawn from the baling chamber. An member actuator selectively rotates the retractable member about the member rotation axis. A dispenser holds a plurality of identification tags so that the tooth portion may engage and move a respective one of the identification tags through the opening and into embedded engagement with the bale when moving from the tag loading position into the installation position.

20 Claims, 10 Drawing Sheets

(56) References Cited

U.S. PATENT DOCUMENTS

| | | |
|---|---|---|
| 7,024,989 B2 | 4/2006 | Preece |
| 7,621,111 B2 | 11/2009 | Roberts |
| 10,436,913 B2 * | 10/2019 | Lang ........................ G01S 19/13 |
| 11,871,703 B2 * | 1/2024 | Kraus ................... B30B 9/3007 |
| 2007/0175341 A1 * | 8/2007 | Roberts ............... A01F 15/0816 |
| | | 100/102 |
| 2012/0048129 A1 * | 3/2012 | Smith ..................... A01F 15/08 |
| | | 235/375 |
| 2014/0157999 A1 | 6/2014 | Verhaeghe et al. |
| 2014/0165858 A1 * | 6/2014 | Simmons ............ A01F 15/0833 |
| | | 100/88 |
| 2022/0015300 A1 * | 1/2022 | Derscheid ............... A01F 15/07 |
| 2022/0124985 A1 * | 4/2022 | Kraus ..................... A01F 15/08 |
| 2022/0153466 A1 * | 5/2022 | Johnson ................... B65C 7/00 |
| 2022/0167560 A1 * | 6/2022 | Herbers ............. A01F 15/0825 |

FOREIGN PATENT DOCUMENTS

| | | |
|---|---|---|
| EP | 3147229 A1 | 3/2017 |
| EP | 3466246 A1 | 4/2019 |

\* cited by examiner

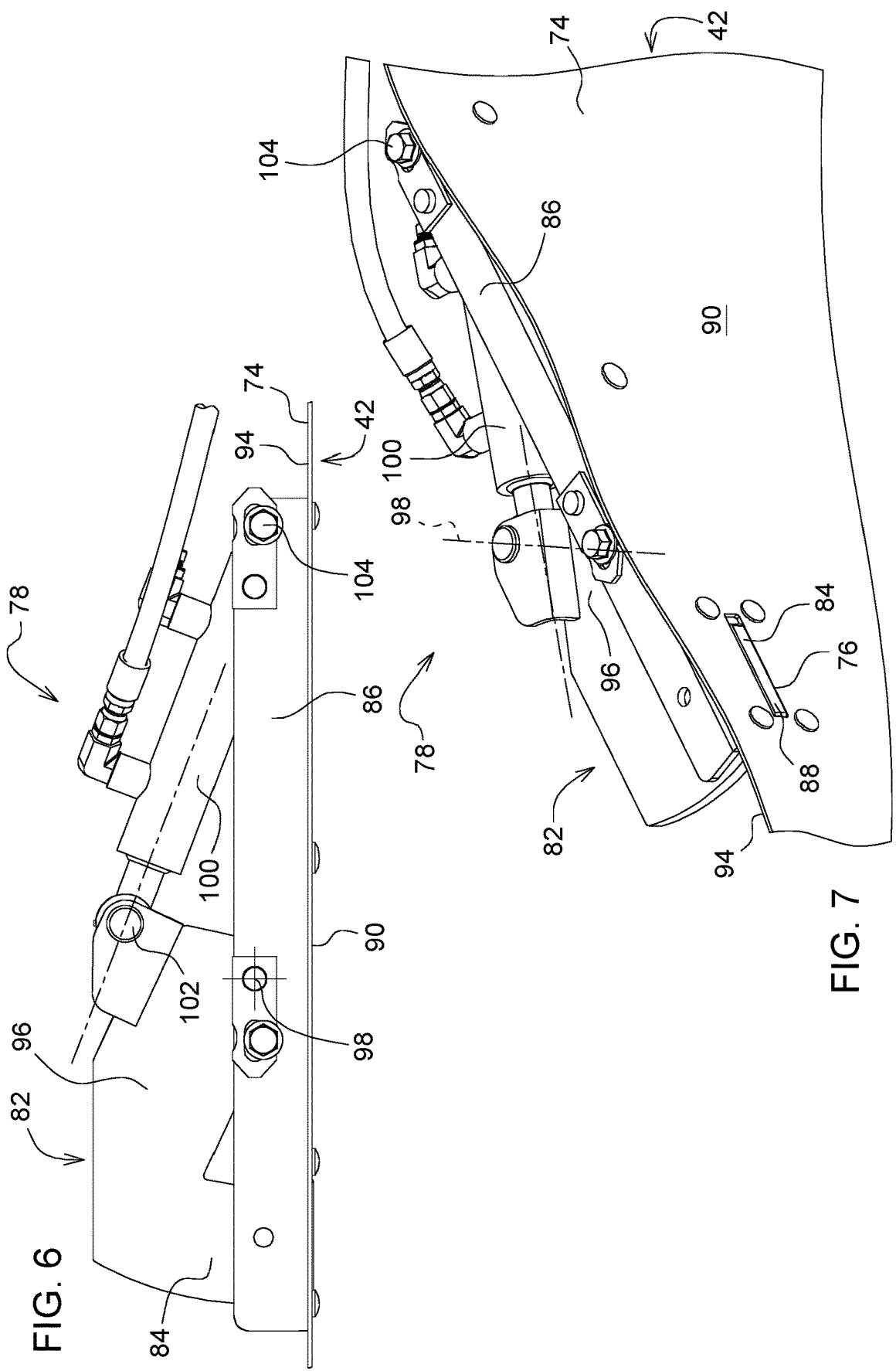

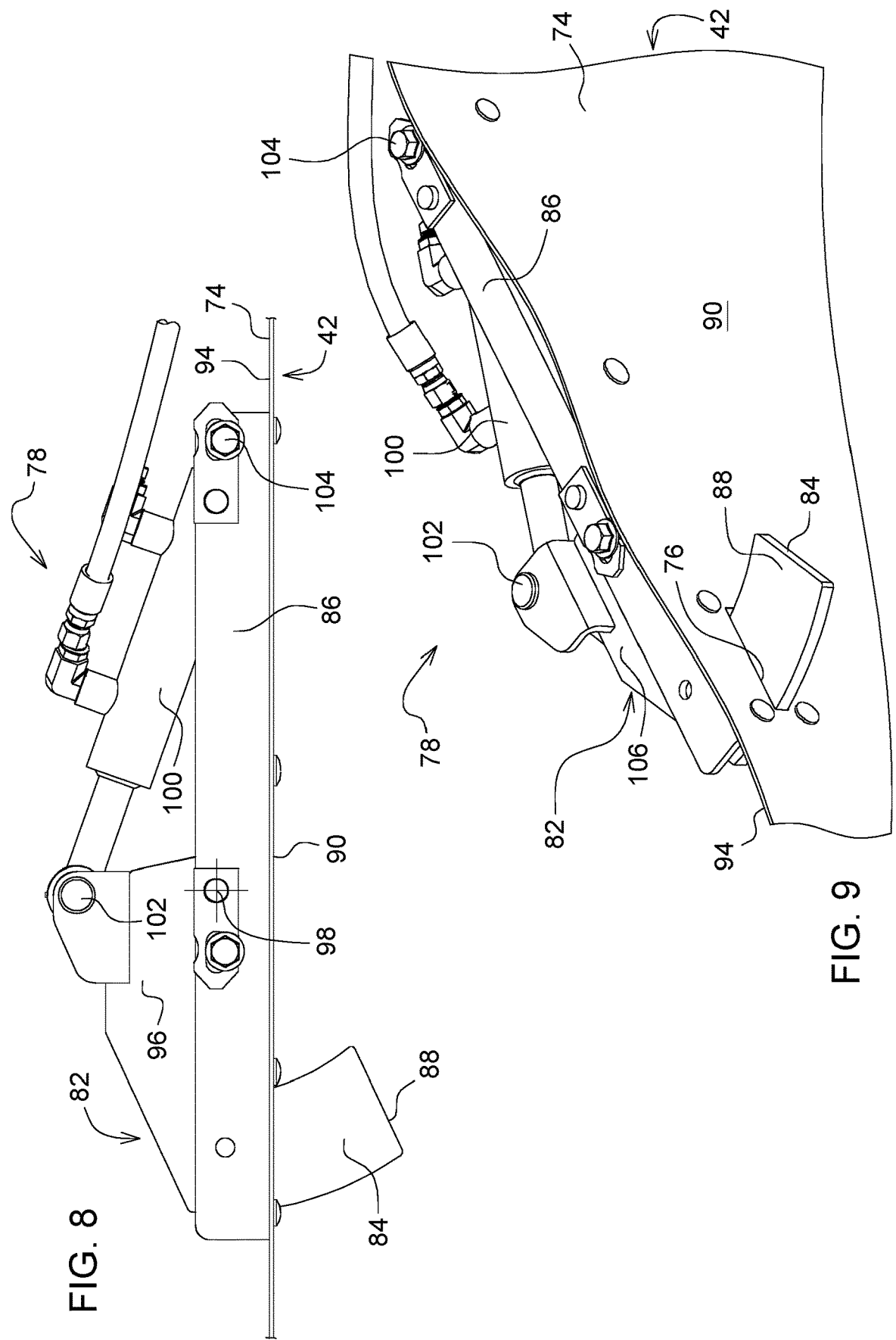

BALE TAGGING DEVICE

TECHNICAL FIELD

The disclosure generally relates to a baler implement, and more particularly to a tag installer for a baler implement.

BACKGROUND

Agricultural baler implements gather, compress, and shape crop material into a bale. There are different types of baler implements that create bales. One type of baler implement is often referred to as a square baler or a large square baler, which produces bales having a rectangular or square shape. These square bales may be referred to as parallelepiped shaped bales. Another type of baler implement is often referred to as a round baler implement, which produces a bale having a round or cylindrical shape.

The bales are formed from crop material and have or exhibit characteristics or properties of the bale and/or the crop material. For example, each bale may exhibit a respective weight, moisture content, material content, ash content, location, etc. Bale producers may desire to identify and track one or more of the characteristics or properties of each respective bale, so that this information may be accurately communicated to an end user or purchaser of that respective bale.

In order to identify and/or track a bale, an identification tag may be attached to the bale. The identification tag may include an electronic device that stores data associated with a specific bale, such as but not limited to an RFID tag, or may include a visual indicator, such as a length of colored flagging that is associated with a specific characteristic of the bale.

SUMMARY

A baler implement is provided. The baler implement includes a housing having a wall. The wall defines a baling chamber for forming crop material into a bale. The wall of the housing includes an opening into the baling chamber. A tag installer is positioned adjacent the opening in the wall. The tag installer includes a retractable member having a tooth portion. The retractable member is rotatably moveable about a member rotation axis relative to the wall between an installation position and a tag loading position. When the retractable member is disposed in the installation position, the tooth portion is positioned to extend through the opening and penetrate the bale within the baling chamber. When the retractable member is disposed in the tag loading position, the tooth portion is withdrawn from the baling chamber. The tag installer further includes a member actuator that is attached to the retractable member. The member actuator is selectively controllable to rotate the retractable member about the member rotation axis between the installation position and the tag loading position. The tag installer further includes a dispenser for holding a plurality of identification tags. The tooth portion of the retractable member is operable to engage and move a respective one of the plurality of identification tags through the opening and into embedded engagement with the bale when moving from the tag loading position into the installation position.

In one implementation of the disclosure, the retractable member is rotatable about a member rotation axis. The member actuator is selectively controllable to rotate the retractable member about the member rotation axis between the installation position and the tag loading position. In other implementations, the retractable member may be linearly moveable, with the member actuator selectively controllable to extend and retract the retractable member along a linear path.

In one aspect of the disclosure, the dispenser includes a magazine assembly. The magazine assembly includes a first magazine and a second magazine. The first magazine is configured for containing a first portion of the plurality of identification tags. The second magazine is configured for containing a second portion of the plurality of identification tags. In one implementation, the first portion of the plurality of identification tags includes a first indicia, and the second portion of the plurality of identification tags includes a second indicia. The first indicia is different than the second indicia. As such, the first indicia may be associated with a first characteristic of the bale, whereas the second indicia may be associated with a second or different characteristic of the bale.

In one aspect of the disclosure, the dispenser includes a magazine actuator that is coupled to the magazine assembly. The magazine actuator is operable to move the magazine assembly relative to the tooth portion to select either the first magazine or the second magazine. In one implementation, a controller is operatively coupled to the magazine actuator. The controller is operable to selectively control the magazine actuator to select the respective one of the plurality of identification tags from one of the first portion of identification tags or the second portion of identification tags based on a characteristic of the bale.

In one aspect of the disclosure, the tooth portion of the retractable member may include a cross sectional shape that is complementary to a shape of the opening.

In one aspect of the disclosure, the member actuator may include a linear member actuator that is operable to extend and retract along a linear path. The member actuator may include a first end pivotably attached to the retractable member at location spaced from the member rotation axis. The retractable member may include a planar structure that includes a base portion, with the tooth portion extending from the base portion at a location spaced from the member rotation axis.

In one implementation of the baler implement, the baling chamber is shaped to form the bale to include a cylindrical shape. The cylindrical shape includes a first circular end face and a second circular end face disposed at opposing ends of the bale relative to a centerline of the cylindrical shape. A circumferential surface extends between the first circular end face and the second circular end face, is concentric with the centerline of the cylindrical shape, and wraps around a circumference of the bale.

In one aspect of the disclosure, the retractable member is positioned outside the baling chamber adjacent an exterior surface of the wall. The opening in the wall may be positioned adjacent one of the first circular end face or the second circular end face when the bale is disposed in the baling chamber to embed the respective one of the plurality of identification tags in one of the first circular end face or the second circular end face.

In one implementation, the wall may include a side wall of a gate disposed at a rearward end of the housing. The gate is rotatably about a gate rotation axis between a closed position for forming the bale and an open position for ejecting the bale from the baling chamber.

A tag installer for a baler implement is also provided. The tag installer includes a support member configured for attachment to a wall of a baling chamber of the baler implement. A retractable member is rotatably attached to the support member for rotation about a member rotation axis. The retractable member includes a tooth portion rotatably moveable about the member rotation axis between an installation position in which the tooth portion is positioned to extend through an opening in the wall and penetrate a bale within the baling chamber, and a tag loading position in which the tooth portion is withdrawn from the baling chamber. An member actuator is attached to the retractable member. The member actuator is selectively controllable to rotate the retractable member about the member rotation axis between the installation position and the tag loading position. The tag installer includes a dispenser that is configured to hold a plurality of identification tags. The tooth portion of the retractable member is operable to engage and move a respective one of the plurality of identification tags through the opening and into embedded engagement with the bale when moving from the tag loading position into the installation position.

In one implementation, the dispenser includes a magazine assembly having a first magazine and a second magazine. The first magazine is configured for containing a first portion of the plurality of identification tags. The second magazine is configured for containing a second portion of the plurality of identification tags. The first portion of the plurality of identification tags may include a first indicia, and the second portion of the plurality of identification tags may include a second indicia that is different than the first indicia. The first indicia may be associated with a first characteristic of the bale, whereas the second indicia may be associated with a second characteristic of the bale.

In one aspect of the disclosure, the dispenser may include a magazine actuator that is coupled to the magazine assembly. The magazine actuator is operable to move the magazine assembly relative to the tooth portion to select one of the first magazine or the second magazine. The tag installer may further included a controller. The controller may be operatively coupled to the magazine actuator and operable to selectively control the magazine actuator to select the respective one of the plurality of identification tags from one of the first portion or the second portion based on a characteristic of the bale.

In one aspect of the disclosure, the member actuator may include a linear member actuator that is operable to extend and retract along a linear path. The member actuator may include a first end pivotably attached to the retractable member at location spaced from the member rotation axis. The retractable member may include a planar structure that includes a base portion, with the tooth portion extending from the base portion at a location spaced from the member rotation axis.

Accordingly, the tag installer may attach the identification tag providing a visual indicia to each of the bales. The visual indicia may include, but is not limited to, a specific color and/or color pattern that is associated with a characteristic of the bale. For example, a green colored identification tag may be associated with a specific location or field from which the bale originated. If configured with the multiple magazines as described above, with each magazine holding a different group of the identification tags, the tag installer may be used to attach one of the plurality of different identification tags to identify a specific characteristic of each bale. For example, a blue colored identification tag may be associated with a moisture content of the bale that is higher than a predefined threshold, whereas a yellow colored identification tag may be associated with a moisture content of the bale that is less than the predefined threshold.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 6 is a schematic fragmentary cross-sectional view of the baler implement showing a retractable member of the tag installer in a rest position.

FIG. 7 is a schematic fragmentary interior perspective view of the baler implement showing the retractable member in the rest position.

FIG. 8 is a schematic fragmentary cross-sectional view of the baler implement showing the retractable member of the tag installer in an installation position.

FIG. 9 is a schematic fragmentary interior perspective view of the baler implement showing the retractable member in the installation position.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a baler implement 20 is generally shown at 20. The example implementation of the baler implement 20 shown in the figures and described herein is configured as a round baler. However, it should be appreciated that the teachings of this disclosure may be applied to other configurations of the baler implement 20, such as but not limited to a small square baler, a large square baler, a cotton baler, etc.

Figure 1:
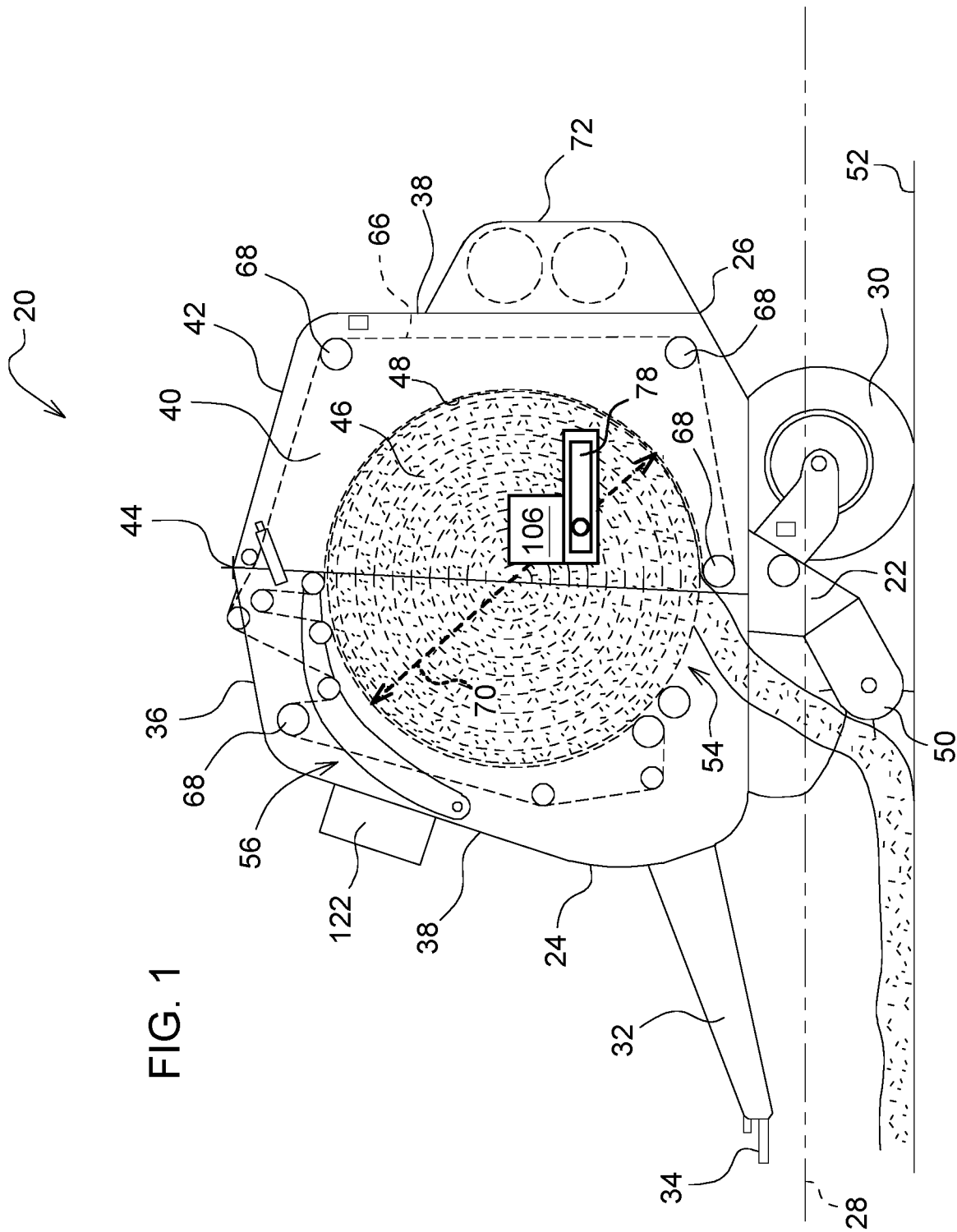
FIG. 1 is a schematic side view of a baler implement showing a gate in a closed position.
Figure 2:
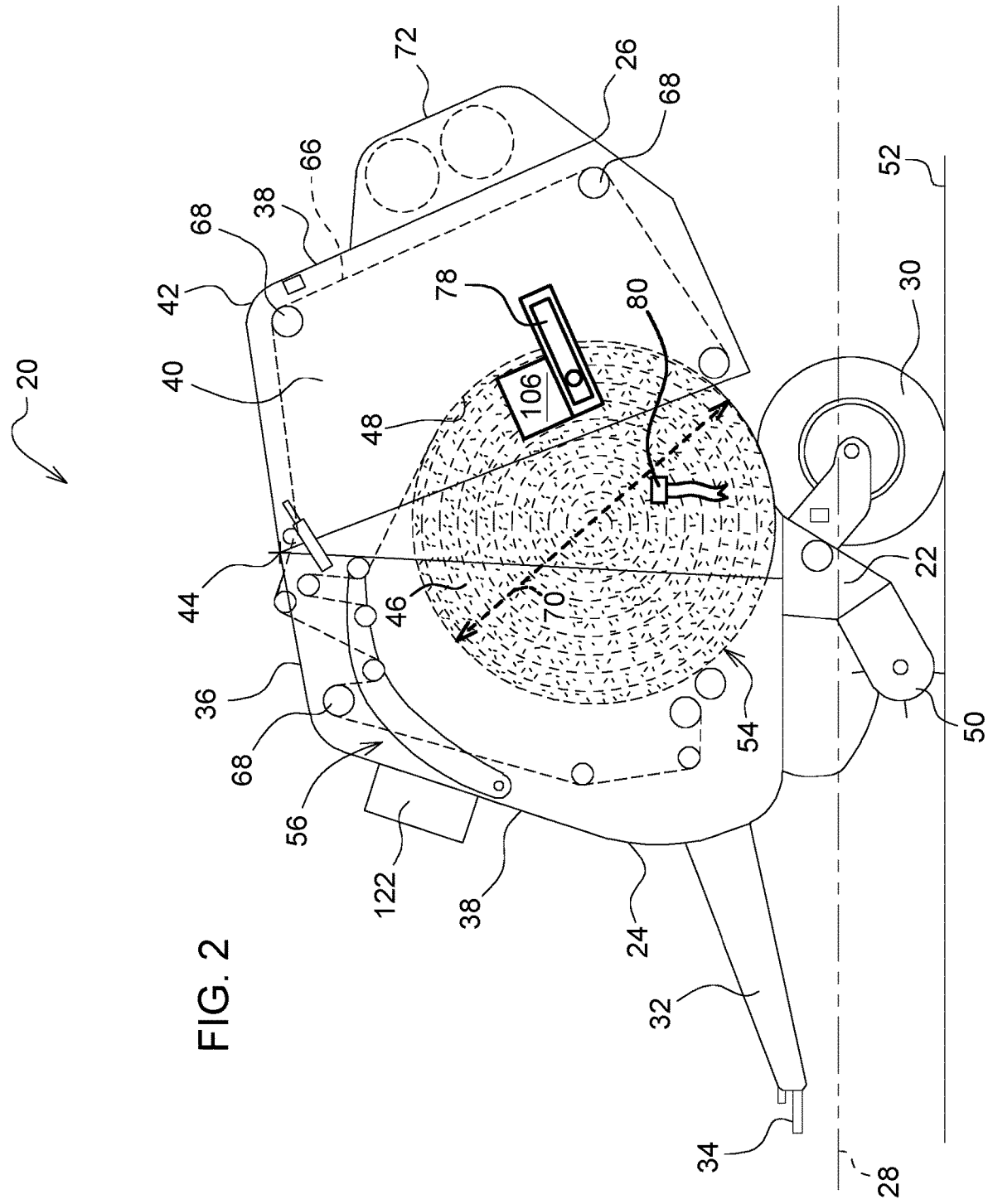
FIG. 2 is a schematic side view of the baler implement showing the gate in an intermediate position.
Figure 3:
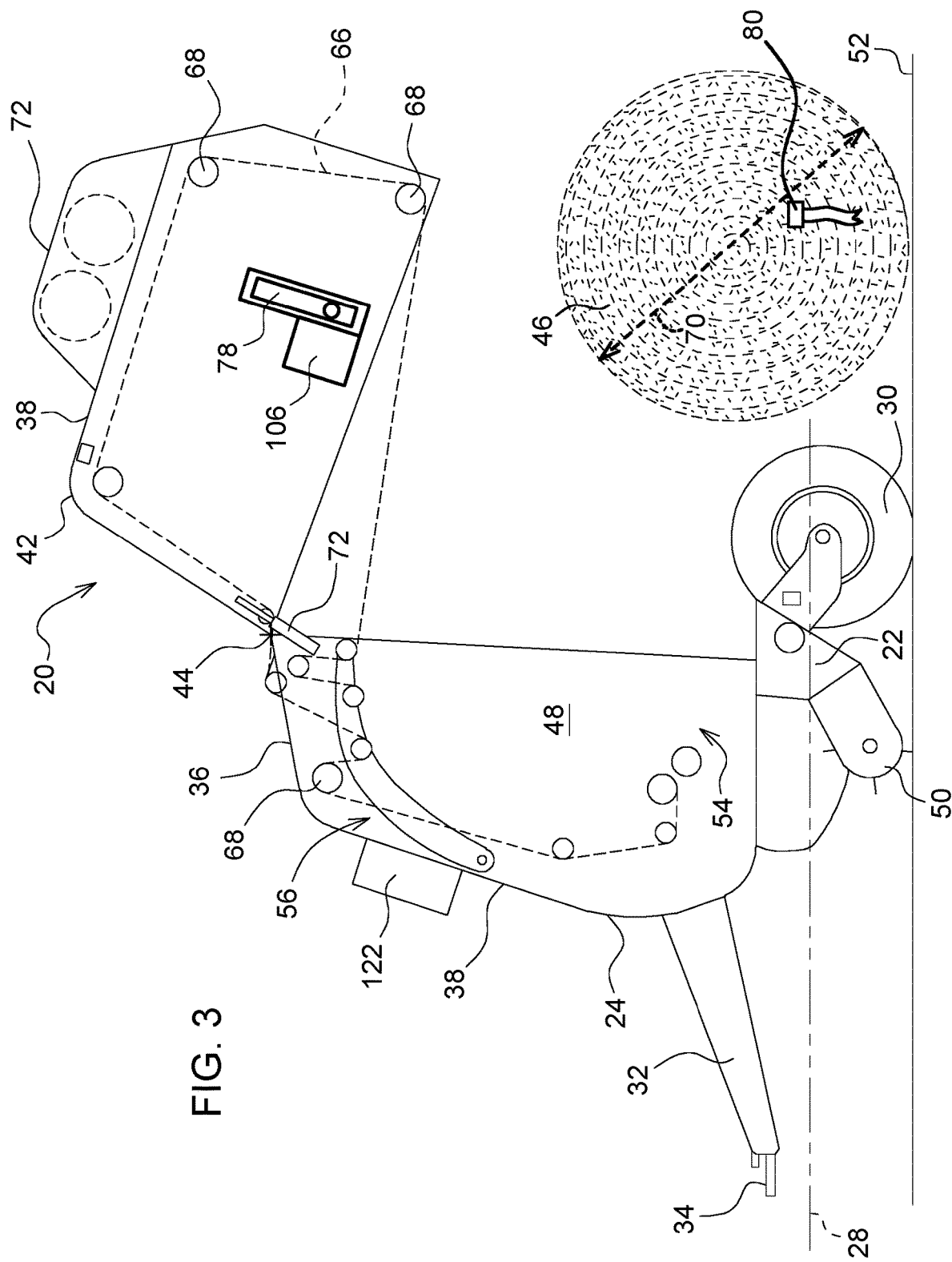
FIG. 3 is a schematic side view of the baler implement showing the gate in an open position.

Referring to FIGS. 1-3, the baler implement 20 includes a frame 22. The frame 22 extends between a forward end 24 and a rearward end 26 along a central longitudinal axis 28 of the frame 22. One or more ground engaging elements 30, such as but not limited to one or more wheels and/or tracks, are attached to and rotatably supported by the frame 22. A tongue 32 may be coupled to the frame 22 at the forward end 24 of the frame 22. A hitch arrangement 34 may be included with the tongue 32. The hitch arrangement 34 may be used to attach the baler implement 20 to a traction unit, such as but not limited to an agricultural tractor. In other embodiments, the baler implement 20 may be self-propelled, in which case the traction unit and the baler implement 20 are configured as a single, self-propelled vehicle.

The baler implement 20 includes a housing 36. The housing 36 is attached to and supported by the frame 22. The housing 36 may include one or more walls 38 or panels that at least partially enclose and/or define an interior region 40. The baler implement 20 may further include a gate 42. The gate 42 may include one or more walls 38 or panels that at least partially enclose and/or define the interior region 40. As such, the housing 36 and the gate 42 cooperate to define the interior region 40 therebetween.

The gate 42 is attached to and rotatably supported by the housing 36 adjacent the rearward end 26 of the frame 22. The gate 42 is pivotably moveable about a gate rotation axis 44. The gate rotation axis 44 is generally horizontal and perpendicular to the central longitudinal axis 28 of the frame 22. The gate 42 is moveable between a closed position (shown in FIG. 1) for forming a bale 46 within a baling chamber 48 within the interior region 40, and an open position (shown in FIG. 3) for discharging the bale 46 from the baling chamber 48.

The baler implement 20 includes a pick-up 50 disposed proximate the forward end 24 of the frame 22. The pickup gathers crop material from a ground surface 52 and directs the gathered crop material toward and into an inlet 54 of the baling chamber 48. The pickup may include, but is not limited to tines, forks, augers, conveyors, baffles, etc., for gathering and moving the crop material. The baler implement 20 may be equipped with a pre-cutter (not shown), disposed between the pickup and the inlet 54. As such, the pre-cutter is disposed downstream of the pickup and upstream of the inlet 54 relative to a direction of travel of the crop material through the baler implement 20. As is understood by those skilled in the art, the pre-cutter cuts or chops the crop material into smaller pieces.

Figure 4:
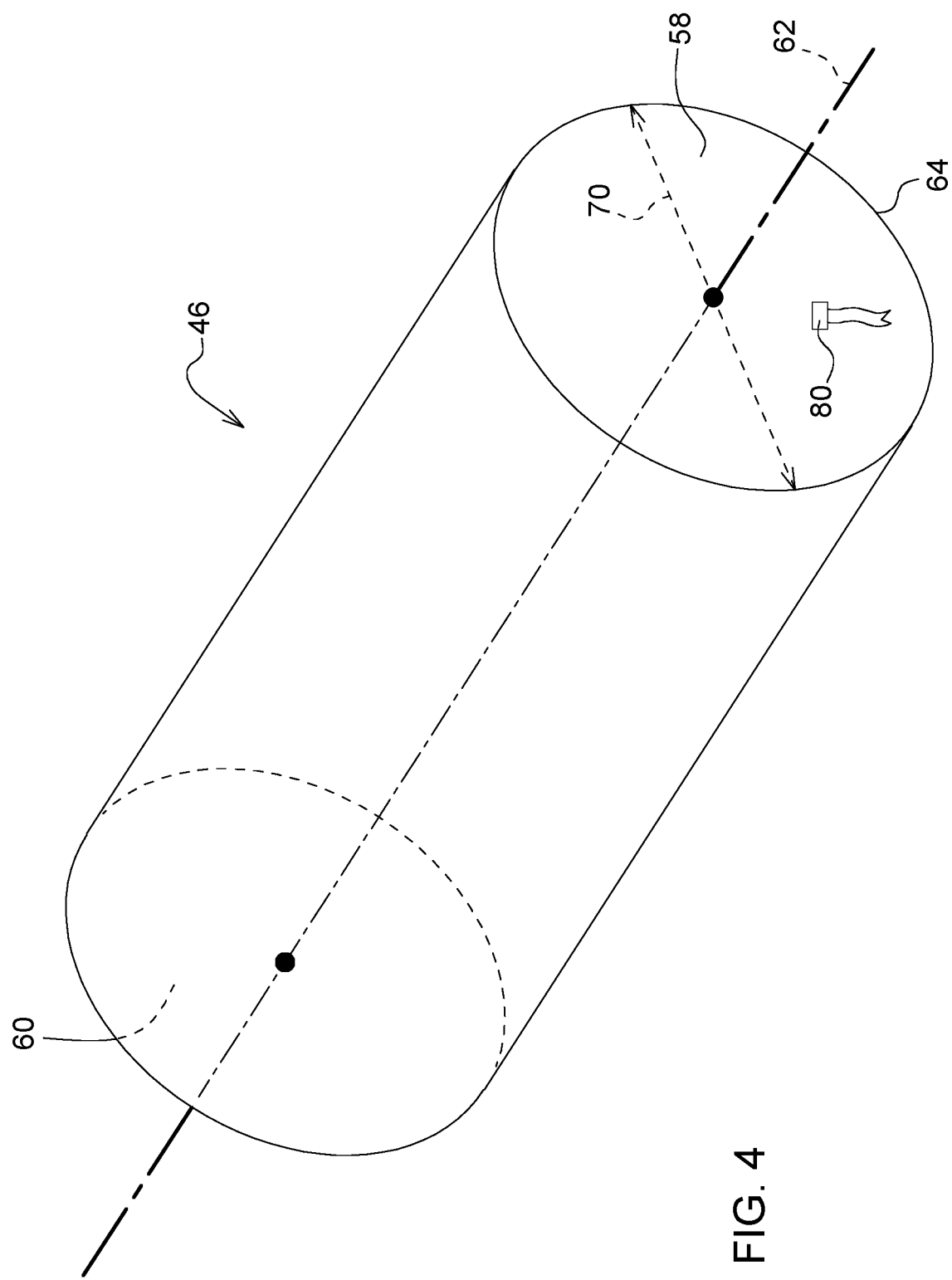
FIG. 4 is a schematic perspective view of a bale.

A bale formation system 56 is disposed within the interior region 40 and defines the baling chamber 48. In the example implementation shown in the Figures and described herein, the bale formation system 56 is operable to form the bale 46 to have a cylindrical shape. Referring to FIG. 4, the cylindrical shape of the bale 46 includes a first circular end face 58 and a second circular end face 60 disposed at opposing ends of the bale 46 relative to a centerline 62 of the cylindrical shape. The centerline 62 of the bale 46 is generally located and extends through respective diametric centers of the first circular end face 58 and the second circular end face 60. The centerline 62 of the cylindrical shape is generally parallel with the gate rotation axis 44 during formation of the bale 46 by the bale formation system 56, within the baling chamber 48. The bale 46 includes a circumferential surface 64 that extends between the first circular end face 58 and the second circular end face 60. The circumferential surface 64 is concentric with the centerline 62 of the cylindrical shape, and wraps around a circumference of the bale 46.

The bale formation system 56 may be configured as a variable chamber system, or as a fixed chamber system. The baler implement 20 shown in the Figures and described herein is depicted and described as a variable chamber baler. Referring to FIGS. 1-3, and as is understood by those skilled in the art, the variable chamber baler includes a plurality of longitudinally extending side-by-side forming belts 66 that are supported by a plurality of rollers 68. The bale 46 is formed by the forming belts 66 and one or more walls 38 of the housing 36 and gate 42. As is understood by those skilled in the art, the forming belts 66 are controlled to vary the radial size of the baling chamber 48. As understood by those skilled in the art, if the bale formation system 56 is configured as a fixed chamber baler, the baler implement 20 may include a plurality of rollers 68 rotatably attached to and supported by the housing 36 and the gate 42, and arranged in cross section to form a circular baling chamber 48 having a fixed diameter 70. The specific components and operation of the bale formation system 56, i.e., the variable chamber system or the fixed chamber system, are known to those skilled in the art, are not pertinent to the teachings of this disclosure, and are therefore not described in detail herein.

In the example implementation shown in the figures and described herein, in which the bale formation system 56 includes the variable chamber baler, the crop material is directed through the inlet 54 and into the baling chamber 48, whereby the forming belts 66 roll the crop material in a spiral fashion into the bale 46 having the cylindrical shape. The forming belts 66 apply a constant pressure to the crop material as the crop material is formed into the bale 46. A belt tensioner continuously moves the forming belts 66 radially outward relative to the centerline 62 of the cylindrical bale 46 as a diameter 70 of the bale 46 increases. The belt tensioner maintains the appropriate tension in the belts to obtain the desired density of the crop material.

As shown in FIGS. 1-3, the baler implement 20 includes a wrap system 72. The wrap system 72 is operable to wrap the bale 46 with a wrap material inside the baling chamber 48. Once the bale 46 is formed to a desired size, the wrap system 72 feeds the wrap material into the baling chamber 48 to wrap the bale 46 and thereby secure the crop material in a tight package and maintain the desired shape of the bale 46. The wrap material may include, but is not limited to, a twine, a net mesh, or a solid plastic wrap. Movement of the gate 42 into the open position simultaneously moves the belts clear of the formed bale 46 and allows the formed and wrapped bale 46 to be discharged through the rear of the baling chamber 48.

Referring to FIG. 1, the gate 42 includes a first side wall 74 positioned generally parallel with the first circular end face 58 of the bale 46 during formation of the bale 46 in the bale formation system 56. A second side wall 38 (not shown) is positioned generally parallel with the second circular end face 60 of the bale 46 during formation of the bale 46 in the bale formation system 56. It should be appreciated that the first circular end face 58 and the first side wall 74 may be positioned one either the left side or the right side of the baler implement 20, relative to a direction of travel of the baler implement 20 while gathering crop material, with the second circular end face 60 and a second side wall positioned on the other of the left side or the right side of the baler implement 20, opposite the first circular end face 58 and the first side wall 74.

One of the walls 38 of the housing 36 or the gate 42 define an opening 76 into the baling chamber 48. In the example implementation described herein and shown in the Figures, the first side wall 74 of the gate 42 defines the opening 76 into the baling chamber 48.

Figure 5:
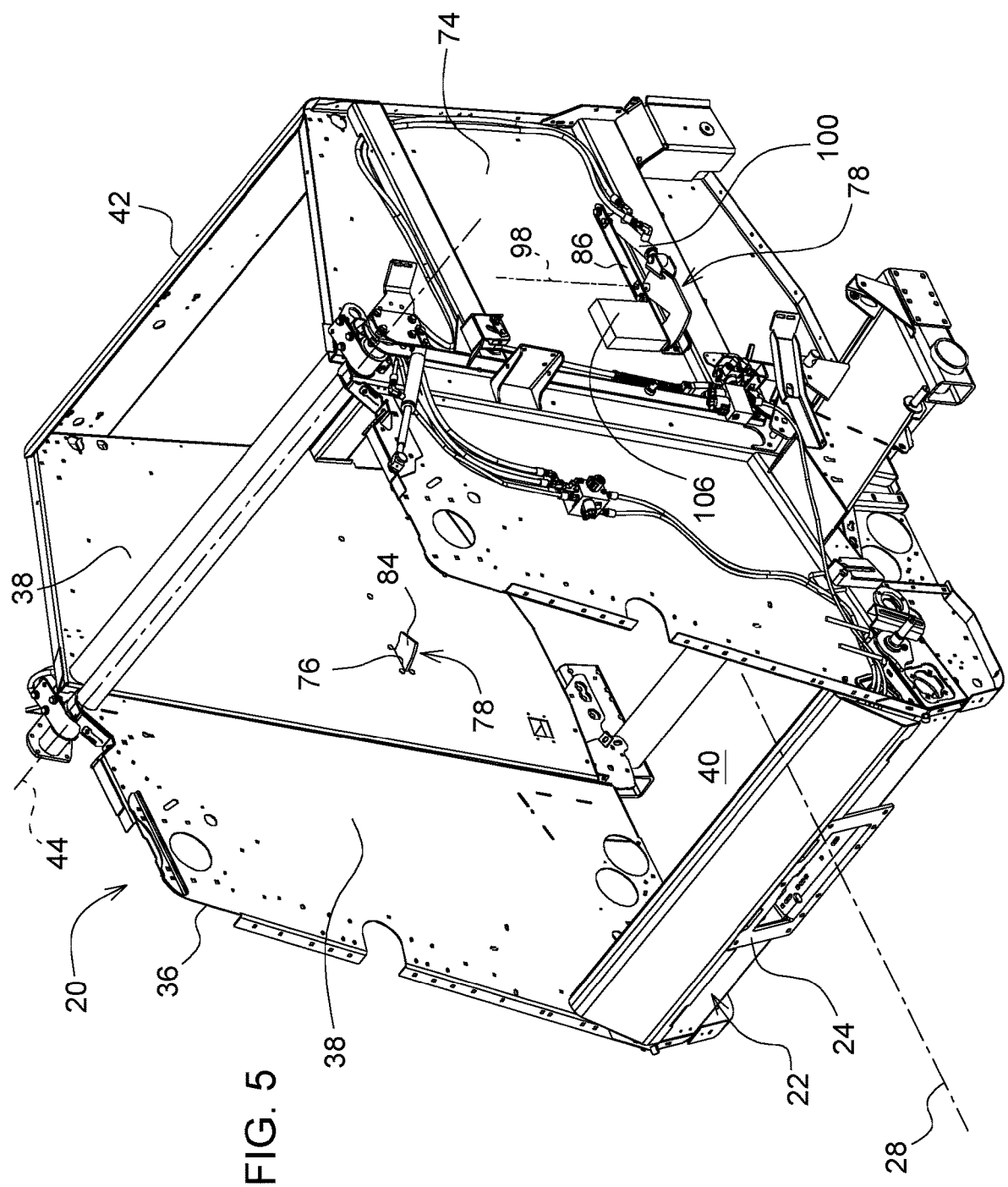
FIG. 5 is a schematic fragmentary exterior perspective view of the baler implement showing a tag installer.

Referring to FIG. 5, the baler implement 20 includes a tag installer 78. The tag installer 78 is operable to attach an identification tag 80 to the bale 46. In some implementations, the tag installer 78 may further be used and/or configured as a bale 46 holder for moving the bale 46 with the gate 42 as the gate 42 moves out of the closed position and toward the open position to assist in discharging the bale 46 from the baling chamber 48, such as shown in FIG. 2. The tag installer 78 is positioned adjacent the opening 76 into the baling chamber 48. In the example implementation shown in the Figures and described herein, the opening 76 is in the first side wall 74 of the gate 42, with the tag installer 78 attached to and moveable with the gate 42. However, in other implementations, the tag installer 78 may be attached to the housing 36, with the opening 76 formed by one of the walls 38 of the housing 36.

While the detailed description describes a single tag installer 78 positioned adjacent the first side wall 74 for engaging the first circular end face 58 of the bale 46, it should be appreciated that a second, mirror copy of the tag installer 78 may be included adjacent the second side wall for engaging the second circular end face 60 of the bale 46. In one example implementation, the tag installer 78 adjacent the first side wall 74 may be configured for attaching a first identification tag 80 to the first circular end face 58 of the bale 46, and the tag installer 78 adjacent the second side wall may be configured for attaching a second or different identification tag 80 to the second circular end face 60 of the bale 46.

Referring to FIGS. 6-10, the tag installer 78 is shown in detail. The tag installer 78 includes a retractable member 82. The retractable member 82 is rotatably moveable between an installation position, shown in FIGS. 8 and 9, and a tag loading position, shown in FIG. 10. The retractable member 82 includes a tooth portion 84. When the retractable member 82 is disposed in the installation position, the tooth portion 84 is positioned to extend through the opening 76 and penetrate the bale 46 within the baling chamber 48. When the retractable member 82 is disposed in the tag loading position, the tooth portion 84 is withdrawn from the baling chamber 48 and not engaged with the bale 46.

Referring to FIGS. 6-10, the tag installer 78 includes a support member 86. The support member 86 may be configured in a suitable manner for attachment to the gate 42. The support member 86 may include plates, channel members, tubular members, etc., configured to support the retractable member 82 and other components of the tag installer 78, and enable attachment to the gate 42. In the example implementation shown in the Figures, the support member 86 is attached to the first side wall 74. However, in other implementations, the support member 86 may be attached to other components of the gate 42 and positioned adjacent to the first side wall 74.

Figure 10:
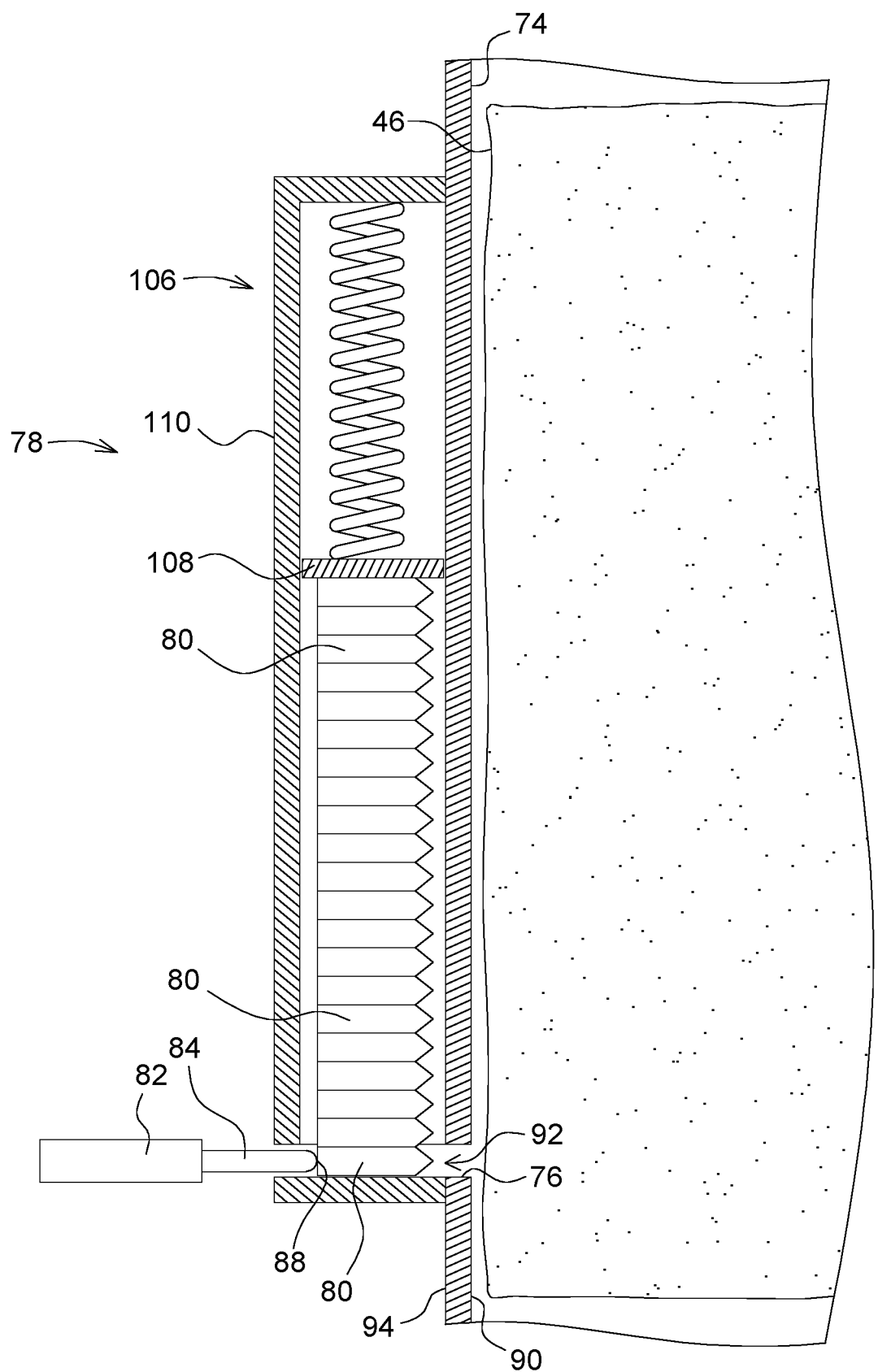
FIG. 10 is a schematic fragmentary cross sectional end view of the baler implement showing the retractable member in a tag loading position.
Figure 11:
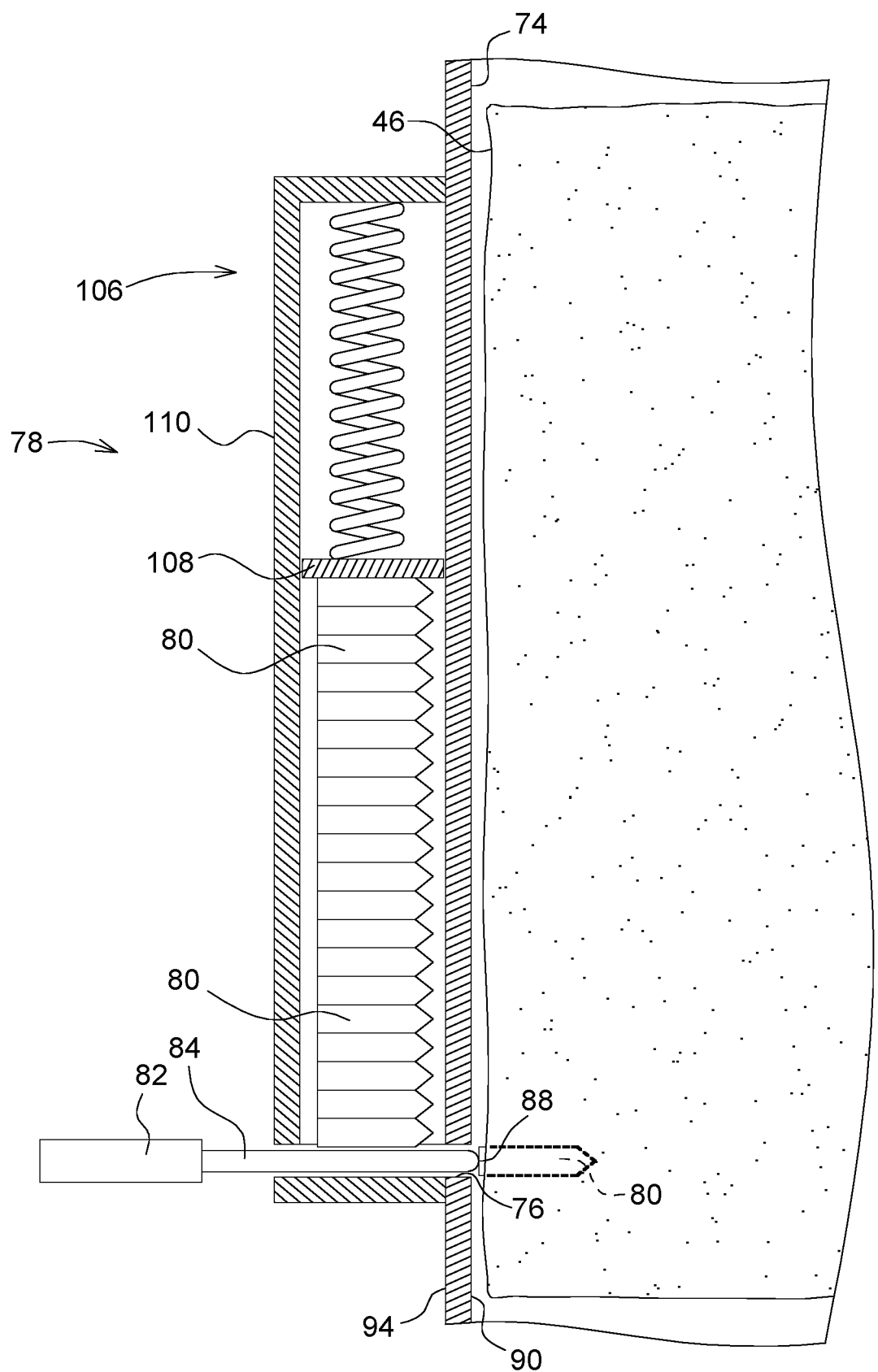
FIG. 11 is a schematic fragmentary cross sectional end view of the baler implement showing the retractable member in the installation position with an identification tag attached to a bale.
Figure 12:
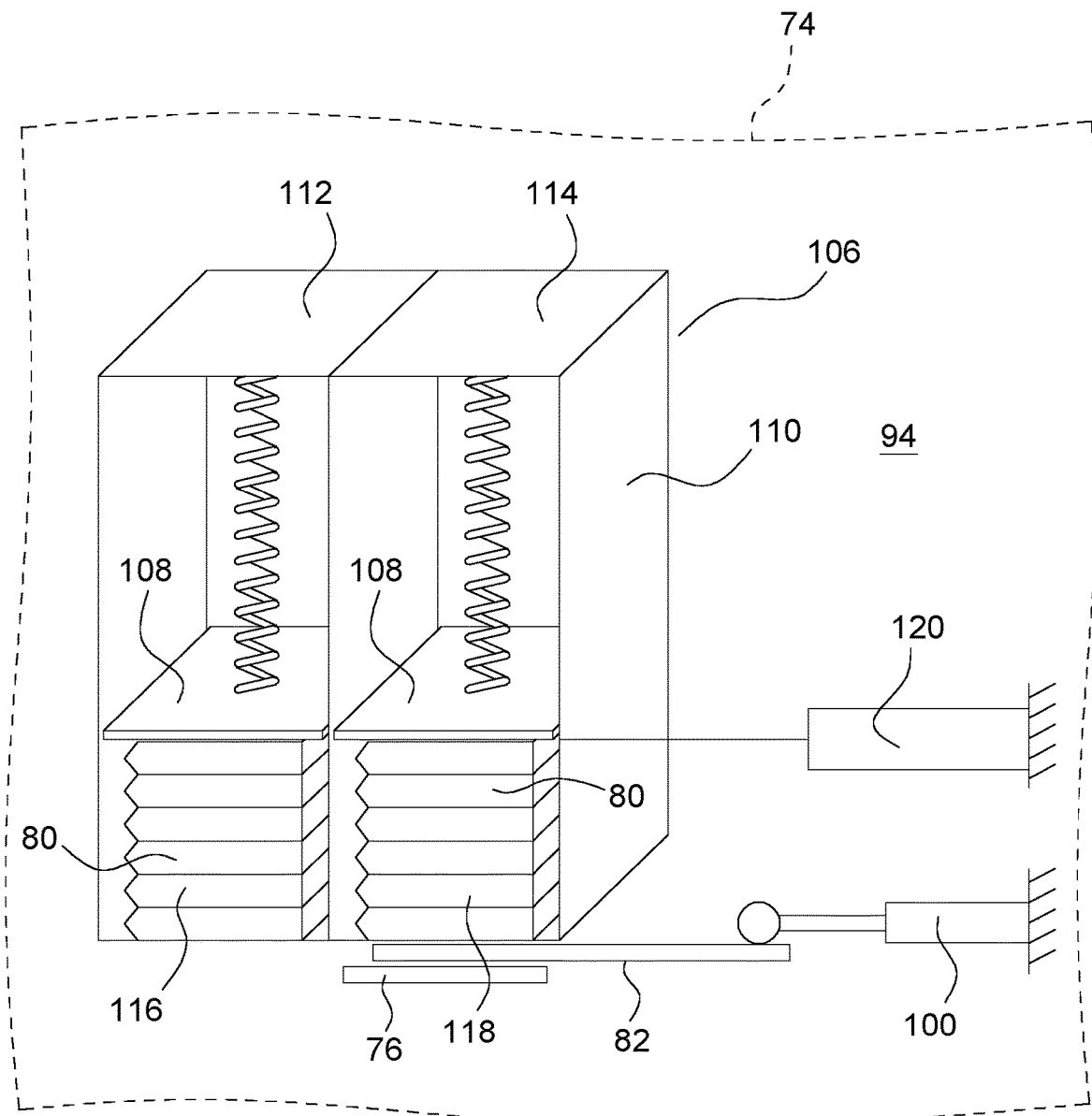
FIG. 12 is a schematic perspective view of the tag installer.

The retractable member 82, and particularly the tooth portion 84 of the retractable member 82, is positioned and moveable within the opening 76. The tooth portion 84 of the retractable member 82 includes a shape that is complimentary to a shape of the opening 76. As such, the retractable member 82 may be positioned to substantially fill the opening 76. FIGS. 6 and 7 show the retractable member 82 in a rest position, disposed between the tag loading position and the installation position. As shown in FIGS. 6 and 7, the tooth portion 84 of the retractable member 82 includes an end surface that is positioned substantially flush with an interior surface 90 of the first side wall 74 when the retractable member 82 is positioned in the rest position. Because the shape of the end surface of the tooth portion 84 compliments the shape of the opening 76, generally filling the opening 76, crop material is prevented from becoming caught and/or intertwined around the retractable member 82 when the retractable member 82 is disposed in the rest position. As shown in FIGS. 8 and 9, the tooth portion 84 is projected inward into the interior region 40 and the baling chamber 48, into engagement with the first circular end face 58 of the bale 46 when the retractable member 82 is disposed in the installation position. As shown in FIG. 10, the tooth portion 84 is moved outwardly and laterally away from the first side wall 74 to provide a gap 92 between the end surface of the tooth portion 84 and an exterior surface 94 of the first side wall 74.

Referring to FIG. 7, the opening 76 in the first side wall 74 has a generally rectangular shape. The retractable member 82 includes a generally planar structure having a base portion 96 and the tooth portion 84. The end surface of the tooth portion 84 includes a generally rectangular shape complimentary in size to that of the opening 76, such that the tooth portion 84 generally fills the opening 76 in the first side wall 74.

Referring to FIGS. 6 and 8, the retractable member 82 is rotatable relative to the first side wall 74 about a member rotation axis 98. In one implementation, the retractable member 82 is rotatably attached to the support member 86 for rotation about the member rotation axis 98. The member rotation axis 98 is arranged in a generally vertical orientation, such that the retractable member 82 generally moves on a horizontal plane.

The tooth portion 84 of the retractable member 82 extends away from the base portion 96 at a location that is spaced from the member rotation axis 98. The base portion 96 of the retractable member 82 is positioned adjacent to the exterior surface 94 of the first side wall 74, with the tooth portion 84 extending through the opening 76. Rotation of the base portion 96 about the member rotation axis 98 causes the tooth portion 84 to move toward and into the baling chamber 48 or away from and out of the baling chamber 48.

The tag installer 78 includes a member actuator 100. The member actuator 100 interconnects the retractable member 82 and the gate 42. The member actuator 100 is attached to the retractable member 82 and is selectively controllable to rotate the retractable member 82 about the member rotation axis 98 between the installation position, the rest position, and the tag loading position.

In one implementation, the member actuator 100 includes a linear member actuator 100 that is operable to extend and retract along a linear path. The linear member actuator 100 may include, but is not limited to, a hydraulic cylinder, and electric linear member actuator 100, a pneumatic member actuator 100, etc. The member actuator 100 includes a first end 102 pivotably coupled to the base portion 96 of the retractable member 82 at a location spaced from the member rotation axis 98. A second end 104 of the member actuator 100 is coupled or attached to the gate 42. For example, the second end 104 of the member actuator 100 may be attached to the support member 86, the first side wall 74, or some other structure of the gate 42. The member actuator 100 extends and retracts to move the retractable member 82 between the installation position, the rest position, and the tag loading position.

The tag installer 78 further includes a dispenser 106. For clarity, the dispenser 106 is not shown with the tag installer 78 in FIGS. 6-9. The dispenser 106 holds or contains a plurality of the identification tags 80. The tooth portion 84 of the retractable member 82 is operable to engage and move a respective one of the identification tags 80 through the opening 76 and into embedded engagement with the bale 46 when moving from the tag loading position into the installation position. In the example implementation shown in the Figures and described herein, the opening 76 in the first side wall 74 is positioned adjacent one of the first circular end face 58 or the second circular end face 60 when the bale 46 is disposed in the baling chamber 48 to embed the respective identification tag 80 in one of the first circular end face 58 or the second circular end face 60.

The dispenser 106 is configured to provide one of the identification tags 80 to the tooth portion 84 of the retractable member 82 when the retractable member 82 is positioned in the tag loading position. For example, the dispenser 106 may include a magazine follower 108 that pushes a vertical stack of the identification tags 80 toward the retractable member 82. The magazine follower 108 may be automatically actuated by a biasing device, such as but not limited to, a spring, or may be selectively activated with an actuation device, such as an electric motor or the like. As such, when the retractable member 82 moves into the tag loading position forming the gap 92 between the end surface of the tooth portion 84 and the exterior surface 94 of the first side wall 74, the magazine follower 108 may push one of the identification tags 80 into the gap 92 between the end surface of the tooth portion 84 and the exterior surface 94 of the first side wall 74, such that when the retractable member 82 moves into the installation position, the tooth portion 84 pushes the identification tag 80 through the opening 76 and into the bale 46 within the baling chamber 48. It should be appreciated that the dispenser 106 may be configured and operate differently than described herein.

In the example implementation shown in the Figures and described herein, the dispenser 106 includes a magazine assembly 110 having a first magazine 112 and a second magazine 114. The first magazine 112 is configured to contain a first portion 116 of the identification tags 80. The second magazine 114 is configured to contain a second portion 118 of the identification tags 80. The first portion 116 of the identification tags 80 may include a first indicia, whereas the second portion 118 of the identification tags 80 may include a second indicia. The first indicia and the second indicia may be configured differently, such that each of the first portion 116 of the identification tags 80 and the second portion 118 of the identification tags 80 may be associated with a different characteristic of the bale 46. The first indicia and the second indicia may each include, but are not limited to, a color, a color combination, text, symbol, graphics, etc. The different characteristics of the bale 46 may include, but are not limited to, a moisture content of the bale 46, a location from which the bale 46 was formed, a weed and/or crop content of the bale 46, etc. While the example implementation shows and described two portions of the identification tags 80, it should be appreciated that the plurality of identification tags 80 may be subdivided into any number of portions, with each portion having a respective magazine for containing and supplying them.

The dispenser 106 may include a magazine actuator 120 coupled to the magazine assembly 110. The magazine actuator 120 is operable to move the magazine assembly 110 or components thereof relative to the tooth portion 84. More specifically, the magazine actuator 120 is configured to position one of the first magazine 112 or the second magazine 114 in a position to supply the respective identification tag 80 to the retractable member 82.

The magazine actuator 120 may include, but is not limited to, structural components that enable movement, such as but not limited to, gears, levers, slides, tracks, springs, etc. Additionally, the magazine actuator 120 may include an electric motor, hydraulic motor, pneumatic motor, etc., capable of moving the magazine assembly 110, or components thereof, to position one of the first magazine 112 or the second magazine 114 relative to the tooth portion 84 of the retractable member 82.

The baler implement 20 may further include a controller 122 operatively coupled to the member actuator 100 and/or the magazine actuator 120. The controller 122 is configured to selectively control operation and/or position of the member actuator 100 to move the retractable member 82 between the tag loading position, the rest position, and the installation position. Additionally, the controller 122 may be configured to selectively control operation and/or position of the magazine actuator 120 to position one of the first magazine 112 or the second magazine 114 relative to the tooth portion 84, in order to select the respective one of the identification tags 80 from one of the first portion 116 or the second portion 118 based on a characteristic of the bale 46.

While the controller 122 is generally described herein as a singular device, it should be appreciated that the controller 122 may include multiple devices linked together to share and/or communicate information therebetween. Furthermore, it should be appreciated that the controller 122 may be located on the baler implement 20 or located remotely from the baler implement 20, such as on a tow vehicle.

The controller 122 may alternatively be referred to as a computing device, a computer, a controller 122, a control unit, a control module, a module, etc. The controller 122 includes a processor 124, a memory 126, and all software, hardware, algorithms, connections, sensors, etc., necessary to manage and control the operation of the member actuator 100 and/or the magazine actuator 120. As such, a method may be embodied as a program or algorithm operable on the controller 122. It should be appreciated that the controller 122 may include any device capable of analyzing data from various sensors, comparing data, making decisions, and executing the required tasks.

As used herein, "controller 122" is intended to be used consistent with how the term is used by a person of skill in the art, and refers to a computing component with processing, memory 126, and communication capabilities, which is utilized to execute instructions (i.e., stored on the memory 126 or received via the communication capabilities) to control or communicate with one or more other components. In certain embodiments, the controller 122 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 122 may be in communication with other components on the baler implement 20, such as hydraulic components, electrical components, sensors, and operator inputs within an operator station of an associated work vehicle. The controller 122 may be electrically connected to these other components by a wiring harness such that messages, commands, and electrical power may be transmitted between the controller 122 and the other components. Although the controller 122 is referenced in the singular, in alternative embodiments the configuration and functionality described herein can be split across multiple devices using techniques known to a person of ordinary skill in the art.

The controller 122 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 126 may include any non-transitory/tangible medium which participates in providing data or computer-readable instructions. The memory 126 may be non-volatile or volatile. Non-volatile media may include, for example, optical or magnetic disks and other persistent memory. Example volatile media may include dynamic random access memory (DRAM), which may constitute a main memory. Other examples of embodiments for memory 126 include a floppy, flexible disk, or hard disk, magnetic tape or other magnetic medium, a CD-ROM, DVD, and/or any other optical medium, as well as other possible memory devices such as flash memory.

The controller 122 includes the tangible, non-transitory memory 126 on which are recorded computer-executable instructions, including a tag installation algorithm 128. The processor 124 of the controller 122 is configured for executing the tag installation algorithm 128. The tag installation algorithm 128 implements a method of attaching a respective one of the identification tags 80 to the bale 46.

During operation, while the bale 46 is being formed within the baling chamber 48, the controller 122 may selectively control the member actuator 100 to position the retractable member 82 in the rest position, such as shown in FIGS. 6 and 7. As described above, when in the rest position, the end surface of the tooth portion 84 is flush with the interior surface 90 of the first side wall 74 so that crop material does not plug the opening 76 and the tooth portion 84 does not interfere with the formation of the bale 46.

When the formation of the bale 46 within the baling chamber 48 is complete, such as shown in FIG. 1, the controller 122 may signal the member actuator 100 to move the retractable member 82 from the rest position, shown in FIGS. 6 and 7, into the tag loading position, shown in FIG. 10. As described above, when the retractable member 82 is disposed in the tag loading position, the end surface of the tooth portion 84 is spaced from the exterior surface 94 of the first side wall 74 to form the gap 92 therebetween. When positioned in the tag loading position, the dispenser 106 may then position a respective one of the identification tags 80 within the gap 92 for engagement with the tooth portion 84 of the retractable member 82. It should be appreciated that the dispenser 106 may be controlled to not position one of the identification tags 80 within the gap 92. In other words, the dispenser 106 need not position an identification tag 80 in the gap 92 for each cycle of the retractable member 82. The dispenser 106 may automatically present the identification tag 80, such as with the spring actuated magazine follower 108 described above, or the controller 122 may selectively activate the dispenser 106 to present the respective identification tag 80.

If the magazine assembly 110 is equipped with multiple groups or portions of the identification tags 80, e.g., the first portion 116 having the first indicia and the second portion 118 having the second indicia, then the controller 122 may determine or identify a characteristic of the bale 46, and select the appropriate identification tag 80 and associated indicia. The controller 122 may then selectively control the magazine actuator 120 to position the magazine assembly 110 so that the appropriate identification tag 80 is provided to the retractable member 82.

With the appropriate identification tag 80 provided to the tooth portion 84 and/or positioned in the gap 92, the controller 122 may then signal the member actuator 100 to move the retractable member 82 into the installation position, shown in FIGS. 8 and 9. In response to the signal, the member actuator 100 extends. Due to the offset between the member rotation axis 98 and the connection between the first end 102 of the member actuator 100 and the base portion 96 of the retractable member 82, extension of the member actuator 100 causes the retractable member 82 to rotate about the member rotation axis 98. This rotation of the base portion 96 moves the tooth portion 84 from the tag loading position into the installation position, in which the tooth portion 84 protrudes into the interior region 40 and into penetrating engagement with the first circular end face 58 of the bale 46 thereby attaching the identification tag 80 to the bale 46.

Once the identification tag 80 is attached to the bale 46, the controller 122 may signal the member actuator 100 to move the retractable member 82 into the rest position, shown in FIG. 10. In response to the signal, the member actuator 100 may retract, thereby causing the base portion 96 of the retractable member 82 to rotate about the member rotation axis 98 and the tooth portion 84 of the retractable member 82 to withdraw from the bale 46. Because the shape of the tooth portion 84 compliments the shape of the opening 76 in the first side wall 74, any debris caught on the tooth portion 84 is scraped off as the tooth portion 84 is withdrawn from the interior region 40 through the first side wall 74. Furthermore, with the end surface of the tooth portion 84 positioned flush against the interior surface 90 of the first side wall 74, there are no portions of the tag installer 78 to interfere with removal of the bale 46 from the interior region 40. Once the tooth portion 84 of the retractable member 82 is withdrawn from the bale 46, the bale 46 is free to fall out of the gate 42 as the gate 42 is moved into the open position, shown in FIG. 3.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler implement comprising:
a housing having a wall defining a baling chamber for forming crop material into a bale;
wherein the wall of the housing includes an opening into the baling chamber;
a tag installer positioned adjacent the opening in the wall, the tag installer including:
a retractable member having a tooth portion and moveable relative to the wall between an installation position in which the tooth portion is positioned to extend through the opening and penetrate the bale within the baling chamber, and a tag loading position in which the tooth portion is withdrawn from the baling chamber;
a member actuator coupled to the retractable member and selectively controllable to move the retractable member between the installation position and the tag loading position;
a dispenser for holding a plurality of identification tags, wherein the tooth portion of the retractable member is operable to engage and move a respective one of the plurality of identification tags through the opening and into embedded engagement with the bale when moving from the tag loading position into the installation position;
wherein the dispenser includes a magazine assembly having a first magazine for containing a first portion of the plurality of identification tags, and a second magazine for containing a second portion of the plurality of identification tags;
wherein the first portion of the plurality of identification tags includes a first visual indicia, and the second portion of the plurality of identification tags includes a second visual indicia that is different than the first visual indicia;
wherein the dispenser includes a magazine actuator coupled to the magazine assembly and operable to move the magazine assembly relative to the tooth portion; and
a controller operatively coupled to the magazine actuator and operable to selectively control the magazine actuator to select the respective one of the plurality of identification tags from one of the first portion or the second portion based on a characteristic of the bale.

2. The baler implement set forth in claim 1, wherein the tooth portion includes a cross sectional shape that is complementary to the opening.

3. The baler implement set forth in claim 1, wherein the member actuator is a linear member actuator operable to extend and retract along a linear path.

4. The baler implement set forth in claim 3, wherein the tooth portion of the retractable member is rotatably moveable about a member rotation axis relative to the wall between the installation position and the tag loading position.

5. The baler implement set forth in claim 4, wherein the member actuator is selectively controllable to rotate the retractable member about the member rotation axis between the installation position and the tag loading position.

6. A baler implement comprising:
a housing having a wall defining a baling chamber for forming crop material into a bale;
wherein the wall of the housing includes an opening into the baling chamber;
a tag installer positioned adjacent the opening in the wall, the tag installer including:
a retractable member having a tooth portion and moveable relative to the wall between an installation position in which the tooth portion is positioned to extend through the opening and penetrate the bale within the baling chamber, and a tag loading position in which the tooth portion is withdrawn from the baling chamber;
a member actuator coupled to the retractable member and selectively controllable to move the retractable member between the installation position and the tag loading position;
a dispenser for holding a plurality of identification tags, wherein the tooth portion of the retractable member is operable to engage and move a respective one of the plurality of identification tags through the opening and into embedded engagement with the bale when moving from the tag loading position into the installation position; and
wherein the tooth portion of the retractable member is rotatably moveable about a member rotation axis relative to the wall between the installation position and the tag loading position.

7. The baler implement set forth in claim 6, wherein the member actuator is selectively controllable to rotate the retractable member about the member rotation axis between the installation position and the tag loading position.

8. The baler implement set forth in claim 7, wherein the member actuator includes a first end pivotably attached to the retractable member at location spaced from the member rotation axis.

9. The baler implement set forth in claim 7, wherein the retractable member includes a planar structure including a base portion, with the tooth portion extending from the base portion at a location spaced from the member rotation axis.

10. The baler implement set forth in claim 6, wherein the retractable member is positioned outside the baling chamber adjacent an exterior surface of the wall.

11. The baler implement set forth in claim 6, wherein the baling chamber is shaped to form the bale to include a cylindrical shape having a first circular end face and a second circular end face disposed at opposing ends of the bale relative to a centerline of the cylindrical shape.

12. The baler implement set forth in claim 11, wherein the opening in the wall is positioned adjacent one of the first circular end face or the second circular end face when the bale is disposed in the baling chamber to embed the respective one of the plurality of identification tags in one of the first circular end face or the second circular end face.

13. The baler implement set forth in claim 11, wherein the wall is a side wall of a gate disposed at a rearward end of the housing, wherein the gate is rotatably about a gate rotation axis between a closed position for forming the bale and an open position for ejecting the bale from the baling chamber.

14. A tag installer for a baler implement, the tag installer comprising:
a support member configured for attachment to a wall of a baling chamber of the baler implement;
a retractable member having a tooth portion moveable between an installation position in which the tooth portion is positioned to extend through an opening in the wall and penetrate a bale within the baling chamber, and a tag loading position in which the tooth portion is withdrawn from the baling chamber;

a member actuator attached to the retractable member and selectively controllable to move the retractable member between the installation position and the tag loading position;

a dispenser for holding a plurality of identification tags, wherein the tooth portion of the retractable member is operable to engage and move a respective one of the plurality of identification tags through the opening and into embedded engagement with the bale when moving from the tag loading position into the installation position wherein the dispenser includes a magazine assembly having a first magazine for containing a first portion of the plurality of identification tags, and a second magazine for containing a second portion of the plurality of identification tags;

wherein the first portion of the plurality of identification tags includes a first visual indicia, and the second portion of the plurality of identification tags includes a second visual indicia that is different than the first visual indicia;

wherein the dispenser includes a magazine actuator coupled to the magazine assembly and operable to move the magazine assembly relative to the tooth portion; and a controller operatively coupled to the magazine actuator and operable to selectively control the magazine actuator to select the respective one of the plurality of identification tags from one of the first portion or the second portion based on a characteristic of the bale.

15. The tag installer set forth in claim 14, wherein the member actuator is a linear member actuator operable to extend and retract along a linear path.

16. The tag installer set forth in claim 15, wherein the retractable member is rotatably attached to the support member for rotation about a member rotation axis, with the tooth portion rotatably moveable about the member rotation axis between the installation position and the tag loading position.

17. The tag installer set forth in claim 16, wherein the member actuator is selectively controllable to rotate the retractable member about the member rotation axis.

18. A tag installer for a baler implement, the tag installer comprising:

a support member configured for attachment to a wall of a baling chamber of the baler implement;

a retractable member having a tooth portion moveable between an installation position in which the tooth portion is positioned to extend through an opening in the wall and penetrate a bale within the baling chamber, and a tag loading position in which the tooth portion is withdrawn from the baling chamber;

a member actuator attached to the retractable member and selectively controllable to move the retractable member between the installation position and the tag loading position;

a dispenser for holding a plurality of identification tags, wherein the tooth portion of the retractable member is operable to engage and move a respective one of the plurality of identification tags through the opening and into embedded engagement with the bale when moving from the tag loading position into the installation position; and wherein the retractable member is rotatably attached to the support member for rotation about a member rotation axis, with the tooth portion rotatably moveable about the member rotation axis between the installation position and the tag loading position.

19. The tag installer set forth in claim 18, wherein the member actuator is selectively controllable to rotate the retractable member about the member rotation axis.

20. The tag installer set forth in claim 19, wherein the member actuator includes a first end pivotably attached to the retractable member at location spaced from the member rotation axis, and wherein the retractable member includes a planar structure including a base portion, with the tooth portion extending from the base portion at a location spaced from the member rotation axis.

\* \* \* \* \*